United States Patent [19]

Iimuro et al.

[11] Patent Number: 5,132,349

[45] Date of Patent: Jul. 21, 1992

[54] PREPARATION PROCESS OF RESIN COMPOSITION HAVING PHENOLIC HYDROXYL GROUPS

[75] Inventors: Shigeru Iimuro, Nagoya; Masahiko Asano, Yokohama; Toshimiki Shimizu, Chita, all of Japan

[73] Assignee: Mitsui Toatsu Chemicals, Inc., Tokyo, Japan

[21] Appl. No.: 696,844

[22] Filed: May 7, 1991

[30] Foreign Application Priority Data

May 9, 1990 [JP] Japan .................. 2-117536

[51] Int. Cl.$^5$ .............................. C08K 5/24
[52] U.S. Cl. .................. 324/265; 524/267; 524/375; 525/393; 525/464; 525/480
[58] Field of Search .............. 525/393, 480, 464; 524/265, 267, 375

[56] References Cited

U.S. PATENT DOCUMENTS 4,368,294 1/1983 Deubzer et al. .................. 525/100

OTHER PUBLICATIONS

Hiemenz, Polymer Chemistry, 1984, pp. 397-399.

Primary Examiner—Melvyn I. Marquis
Attorney, Agent, or Firm—Burns, Doane, Swecker & Mathis

[57] ABSTRACT

A preparation process of a phenol-based resin composition by conducting a crosslinking reaction of a specific silicone compound in the phenol-based resin in the presence of a specific emulsifier, crosslinking agent and catalyst and by the addition of water to disperse resulting silicone rubber as fine particles in the phenol-based resin.

The phenol-based resin of the invention has no time-dependent variation in molding processability and molded products are stable and has no time-dependent change in impact resistance, flexural strength and thermal shock resistance (heat crack resistance), and hence the phenol-based resin composition is used for various molding materials and friction materials which require excellent mechanical strength, crack resistance, thermal shock resistance, stress relaxation resistance or abrasion resistance.

12 Claims, No Drawings

PREPARATION PROCESS OF RESIN COMPOSITION HAVING PHENOLIC HYDROXYL GROUPS

BACKGROUND OF THE INVENTION (a) Field of the Invention

The present invention relates to a process for preparing a composition of resin having phenolic hydroxyl groups (hereinafter referred to as phenol-base resin) which has excellent thermal properties and does not cause time-dependent deterioration in molding processability and mechanical properties such as impact resistance.

(b) Description of the Prior Art

Phenol-based resin has relatively good properties in curing and processing. Cured products of the resin are excellent in electrical and mechanical properties and are widely used as well-balanced materials for molded materials, laminated products, friction materials such as brake linings, shell molds, cast materials and foamed materials. Thus, phenol-based resin is a valuable material in industry.

Phenol-based resin, however, is substantially brittle. When the resin is used for molded materials or laminated products, cracks are liable to develop in a rapid temperature change such as repeated heating and quenching. In the case of molding metal inserted resin, cracks also develop after molding on the contact surface between the metal and the phenol-based resin, and decrease yield of the product.

When phenol-based resin is used for friction materials such as brake lining and as a binder for shell molding materials, cracks or cutouts are apt to occur due to the hard and brittle property of the phenol-based resin.

In order to improve the above disadvantages of phenol-based resin, processes have been proposed to mix nitrile rubber or acrylate base polymers with the phenol-based resin.

Nitrile rubber or acrylate polymers, however, essentially have lower heat resistance than that of the phenol-based resin. Hence, molded articles or laminated products prepared from the phenol-based resin obtained by the above processes decrease their mechanical strengths in continuous use under severe conditions of temperature, for example, 200° C or above. In the case of using these articles or products for friction materials, the field of use is restricted due to lowering of friction coefficient at high temperatures.

As to processes for overcoming these problems, for example, Japanese Laid-open Patent 251452 (1988) and 230661 (1989) disclose phenol-based resin compositions containing dispersed silicone particles in order to improve resistance to cracking, thermal shock and thermal deterioration.

However, silicone rubber dispersed in the phenol-based resin disclosed above exhibits insufficient effect on improving the above properties because of large particle size and incomplete crosslinking reaction.

In practice, when the crosslinking of silicone rubber is unsatisfactory in the phenol-based resin, uncrosslinked silicone separates on the resin surface, gives adverse effects on the viscosity and flowability of a liquid phenol-based resin composition, and causes problems on a solid phenol-based resin, for example, time dependent decrease in flow property which is a curing characteristic of the resin, mechanical strengths, crack resistance, thermal shock resistance and heat deterioration resistance.

SUMMARY OF THE INVENTION

The object of the present invention is to overcome the above problems and to provide a process for preparing a phenol-based resin composition which does not exhibit time dependent decrease in flow property, mechanical strengths, crack resistance, thermal shock resistance and heat deterioration resistance.

As a result of an intensive investigation in order to accomplish the above object, the present inventors have found that the above object can be accomplished by dispersing a sufficiently crosslinked silicone rubber in the phenol-based resin in the form of fine particles. Thus the present invention has been completed.

That is, one aspect of the present invention is a preparation process of a phenol-based resin composition comprising the steps of mixing a heat-melted phenol-based resin with an emulsifier, organopolysiloxane having silanol groups on both ends of molecular chain, a crosslinking agent for silanol condensation and a catalyst for the silanol crosslinking; conducting a condensation reaction of said organopolysiloxane in said phenol-based resin with continuous or intermittent charge of water to the resultant mixture; and removing unnecessary water after finishing the reaction.

DETAILED DESCRIPTION OF THE INVENTION

The characteristic of the invention is to conduct a crosslinking reaction of a specific silicone compound in a phenol-based resin in the presence of a specific emulsifier, crosslinking agent and catalyst under the coexistence of water and to disperse resultant silicone rubber in the phenol based resin in the form of fine particles.

The invention will hereinafter be illustrated in detail.

The resin having phenolic hydroxyl groups (hereinafter referred to as phenol-based resin) for use in the invention includes, for example, novolak resin obtained by reacting one or more compounds having a phenolic hydroxyl group (hereinafter referred to as phenol compound) which are selected from the group consisting of phenols such as phenol, cresol, xylenol, resorcinol, bisphenol A, p-tert-butylphenol and p-octylphenol, and naphthols such as $\alpha$-naphthol and $\beta$-naphthol, with aldehydes such as formaldehyde, paraformaldehyde and other aldehyde sources such as trioxane in the presence of an acid catalyst; resol resin obtained by reacting the above phenol compound with the above aldehydes in the presence of an alkali catalyst; phenol aralkyl resin, for example, MIREX XL-225 (Trade mark of Mitsui Toatsu Chemicals Inc.) which is obtained by reacting the above phenol compound with p-xylylene dihalides such as p-xylylene dichloride or p-xylylene dialkyl ethers such as p-xylylene dimethyl ether; and naphthol aralkyl resin.

No particular restriction is imposed upon the phenol-based resin in the preparation of the phenol-based resin composition of the invention. The phenol-base resin can be used singly or as a mixture.

The emulsifier used in the invention is a modified silicone oil having epoxy groups and/or polyoxyalkylene groups in the side chain and represented by the formula (1):

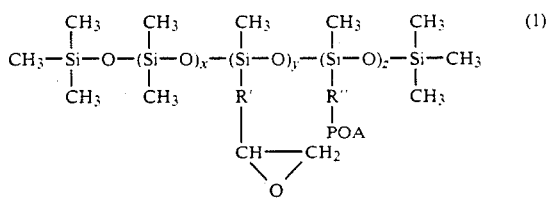

wherein R' and R" are same or different divalent hydrocarbon group of $C_2$ to $C_5$, POA is a polyoxyalkylene group consisting of an ethylene oxide and/or propylene oxide addition product, x is an integer of from 200 to 990, y + z = 10 – 800, and x + y + z < 1000.

No particular limitation is placed on the molecular weight of the modified silicone used for the emulsifier, that is, the values of x, y and z or the chain length of the polyoxyalkylene group in the above formula (1). When the value of z, number of the polyoxyalkylene group, is increased, i.e., the chain length is extended, the organopolysiloxane having silanol groups on both ends of the molecular chain increases compatibility with the phenol-based resin and the particle size of silicone rubber dispersed in the phenol-based resin becomes smaller. On the other hand when the value of z is decreased, i.e., the chain length becomes short, the compatibility is decreased.

As a result, the particle size of the silicone rubber dispersed in the phenol-based resin can be controlled in the range of from 0.1 to 10 μm by suitably selecting the values of x, y and z.

Another emulsifier used in the invention is an ethylene oxide and/or propylene oxide addition product of an alkylphenol/formaldehyde condensation product and represented by the formula (2):

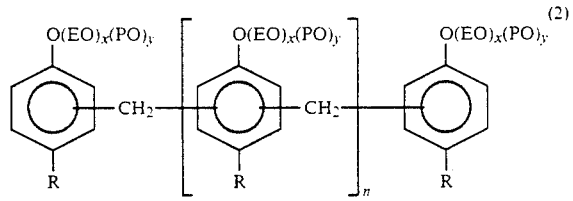

wherein R is an alkyl group of $C_4$ to $C_{12}$, n is an integer of from 1 to 20 in average, EO is an ethylene oxide moiety, PO is a propylene oxide moiety, x and y are integers of from 0 to 100 and $5 = \leq x + y \leq 100$.

R in the above formula (2) is preferably a butyl, hexyl, nonyl or dodecyl group. When R has 3 or less carbon atoms, it becomes difficult to control the particle size the silicone rubber dispersed in the phenol-based resin. On the other hand, R having 13 or more carbon atoms renders the alkylphenol difficult to obtain and is unfavorable in economy. The value of n is from 1 to 20 in average, that is, the average number of alkylphenol in the adduct molecule is from 3 to 22. When n is less than 1 in average, the particle size of the dispersed silicone rubber becomes difficult to control. On the other hand, a value of n larger than 21 in average makes synthesis of the alkylphenol/formaldehyde condensation product difficult.

Assuming that the mole number of added ethylene oxide is z in average and the mole number of added propylene oxide is y in average, the sum of ethylene oxide and propylene oxide addition mole numbers is in the range of from 5 to 100 and x or y is 0 inclusive.

The ethylene oxide and/or propylene oxide addition products of the alkylphenol/formaldehyde condensation product which are used for the emulsifier can control the particle size of the silicone rubber in the phenol-based resin in the range of from 0.1 to 10 μm by suitably selecting the values of x and y, that is, addition mole numbers of ethylene oxide and propylene oxide.

The amount of the emulsifier added is preferably from 0.01 to 25 parts by weight per 100 parts by weight of the phenol-based resin. When the amount is less than 0.01 parts by weight, it becomes difficult in the phenol-based resin to control the particle size of the silicone rubber in the range of from 0.1 to 10 μm. On the other hand, on the amount exceeding 25 parts by weight leads to unfavorably high cost.

The organopolysiloxane which is used for the invention has silanol groups on both ends of the molecular chain and is a compound represented by the formula (3)

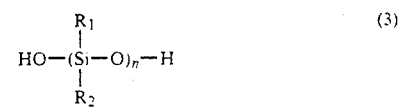

wherein $R_1$ and $R_2$ are same or different hydrocarbon groups.

Exemplary groups which are represented by $R_1$ and $R_2$ in the formula (3) include alkyl groups such as methyl, ethyl, propyl and butyl groups; aryl groups such as phenyl and xylyl groups; and halogenated alkyl groups such as γ-chloropropyl and 3,3,3-trifluoropropyl groups.

The organopolysiloxane having silanol groups on both ends of the molecular chain has preferably a hydroxyl equivalent of from 500 to 200,000. A hydroxyl equivalent of less than 500 cannot provide crack resistance and thermal shock resistance for the phenol-based resin composition. On a other hand, the hydroxyl equivalent exceeding 200,000 makes control of the silicone rubber particle size difficult.

The amount of the organopolysiloxane having silanol groups on both ends of the molecular chain is preferably in the range of from 3 to 50 parts by weight per 100 parts by weight of the phenol-based resin. An amount less than 3 parts by weight is ineffective for improving the crack resistance or the thermal shock resistance of the resulting phenol-based resin composition. On the other hand, an amount exceeding 50 parts by weight unfavorably decreases mechanical strength.

The crosslinking agent used for silanol condensation in the invention is a multifunctional silane or a multifunctional polysiloxane.

In the multifunctional silane, three or more functional groups such as alkoxy, acyloxy, ketoxim, alkenyloxy, aminoxy, amino and hydroxy groups are directly bonded to silicon atoms. Exemplary multifunctional silanes include methyltrimethoxysilane, vinyltrimethoxysilane, 3-chloropropyltrimethoxysilane, 3-aminopropyltriethoxysilane, vinyltriethoxysilane, methyltriethoxysilane and other alkoxysilanes; methyltris(dimethyloxim)silane, methyltris(methylethylketoxim)silane and other ketoximsilanes; vinyltriacetoxysilane, methyltriacetoxysilane and other acyloxysilanes; vinyltripropenyloxysilane, methyltriisobutenylsilane and other alkenyloxysilanes; methyltris(N,N-diamylaminoxy)silane and other aminoxysilanes; and vinyltris(N-butylamino)silane and other aminosilanes.

The multifunctional polysiloxane includes, for example, methylhydrogenpolysiloxane represented by the formula (4):

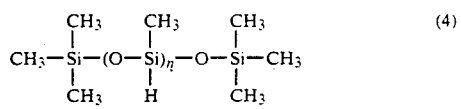

wherein n is an integer of from 3 to 10,000.

The amount of the crosslinking agent for silanol condensation is preferably from 0.05 to 5 parts by weight per 100 parts by weight of the phenol-based resin. An amount less than 0.05 part by weight leads to insufficient crosslinking of silicone rubber and is ineffective for the improvement of resistance to cracking or thermal shock of the phenol-based resin. An amount exceeding 5 parts by weight results in unfavorably high cost.

The above crosslinking agent for silanol condensation can be used singly or as a mixture.

The catalyst used for silanol condensation in the invention is an organotin compounds which is conventionally employed for the production of silicone rubber.

Exemplary organotin compounds include dibutyltin dilaurate, dibutyltin diacetate, stannous oleate and tin-naphthenate.

The amount of the catalyst for silanol condensation is preferably 5 parts by weight or less per 100 parts by weight of organopolysiloxane having silanol groups on both ends of the molecular chain. An amount exceeding 5 parts by weight causes unfavorably high cost.

The above organotin compounds are relatively unstable and are readily hydrolyzed by water. The resultant hydrolyzate is an active catalyst for crosslinking silicone rubber. Accordingly, addition of water to the reaction system is required for completing the crosslinking reaction of silicone rubber.

In practice, heat-melted phenol-based resin is mixed with (a) an emulsifier and then (b) an organopolysiloxane having silanol groups on both ends of the molecular chain, (c) a crosslinking agent for silanol condensation and (d) a catalyst for silanol condensation are added and thoroughly mixed. Thereafter, water is continuously or intermittently added to the resultant mixture and the crosslinking reaction of silicone rubber is progressed in the phenol-based resin. Water for use in the reaction may contain impurities. However, it is preferably clarified water, distilled water, clean water, deionized water or steam which is obtained by removing the impurities. Water is required in an amount of from 0.1 to 100 parts by weight per 100 parts by weight of the phenol-based resin. When the amount is less than 0.1 part by weight, the crosslinking reaction of silicone rubber which is a characteristic of the invention cannot be fully progressed. On the other hand, an amount exceeding 100 parts by weight makes the dehydration step unfavorably difficult after finishing the reaction and is also dangerous because bumping or steam explosion is liable to occur.

Consequently, it is preferred to add the water continuously or intermittently over 1 to 15 hours in an amount of from 0.1 to 100 parts by weight per 100 parts by weight of the phenol-based resin.

The use of water is effective for activating the catalyst for the silanol condensation of silicone rubber and additionally has an advantage that low molecular weight byproducts formed by the condensation reaction can be removed from the reaction system by distilling off with water. Thus, the crosslinking reaction of silicone rubber is assumed to progress more completely.

In the embodiments of preparation process of the phenol-based resin composition in the present invention, 100 parts by weight of the phenol-based resin is heatmelted at 60 to 200° C in the presence or absence of a solvent, and then (a) from 0.01 to 25 parts by weight of the emulsifier is added with stirring and mixed thoroughly. In the step of selecting the emulsifier, the values of x, y and z in the above formula (1) or the values of x and y in the above formula (2) are determined so as to obtain a desired particle size of dispersed silicone rubber in the phenol-based resin. Successively (b) from 3 to 50 parts by weight of organopolysiloxane having silanol groups on both ends of the molecular chain, (c) from 0.05 to 5 parts by weight of the crosslinking agent for silanol condensation and (d) 5 parts by weight or less of the silanol condensation catalyst per 100 parts by weight of organopolysiloxane having silanol groups on both ends of molecular chain are added and thoroughly mixed. Thereafter (e) from 0.1 to 100 parts by weight of water per 100 parts by weight of the phenol-based resin are continuously or intermittently added over 1 to 15 hours and a crosslinking reaction of the silicone rubber is carried out in the phenol-based resin at 60 to 200° C.

Previous mixing of the three components, i.e., (b) organopolysiloxane having silanol groups on both ends of the molecular chain, (c) crosslinking agent for silanol condensation and (d) catalyst for silanol condensation, is unfavorable because the crosslinking reaction progresses in the course of addition. It is preferred to add at least one component separately from other components. After all components which form silicone rubber are added to the phenol-based resin, crosslinking reaction of the silicone rubber is carried out in the phenol-based resin while continuously or intermittently adding water to the resultant mixture. After finishing the reaction, unnecessary water in the system is removed at atmospheric pressure or under reduced pressure to obtain the phenol-based resin composition.

The particle size of the dispersed silicone rubber particle in the phenol-based resin composition thus prepared can be readily measured with an electron microscope or an optical microscope.

According to the present invention, the crosslinking reaction of the silicone rubber can be sufficiently progressed in the phenol-based resin and said silicone rubber can be uniformly dispersed in the phenol-based resin in the form of fine particles.

Consequently, the phenol-based resin composition obtained by the process of the present invention has excellent mechanical strength which is characteristic of the phenol-based resin materials and also has crack resistance and heat deterioration resistance of silicone rubber. Further, time dependent decrease in these properties and processability is not observed.

EXAMPLES

The present invention will hereinafter be illustrated further detail by way of examples and test examples. Parts in examples indicate parts by weight.

The emulsifiers represented by the formula (2) which were used in the examples were condensation products of various phenols with formaldehyde by a conventional method in the presence of a sulfuric acid catalyst.

The average of n in the formula (2) was calculated from the average number of nucleus obtained by gel permeation chromatography (hereinafter referred to as GPC).

Addition polymerizaton of ethylene oxide and/or propylene oxide was carried out at high temperature under increased pressure so as to obtain the desired emulsifier.

EXAMPLE 1

A hundred parts of phenol novolak resin (Trade mark; NOVOLAK #2000, manufactured by Mitsui Toatsu Chemicals Inc.) were heat-melted at 170° C, and 3 parts of a modified silicone oil which was illustrated by the formula (1), contained both epoxy and POA groups, and had a viscosity of 3500 cst at 25° C and an epoxy equivalent of 6400 (Trade mark; SF8421, manufactured by Toray.Dow Corning.Silicone) were added with stirring and further stirred for 30 minutes.

Successively 10 parts of organopolysiloxane which was illustrated by the formula (3) having a methyl group as $R_1$ and $R_2$ and had a hydroxyl equivalent of 2000 and silanol groups on both ends of the molecular chain were added to the above mixture and stirred for an hour. Further, a mixture composed of 0.25 part of methyltrimethoxysilane and 0.02 part of dibutyltin diacetate was added and stirred for 30 minutes.

Thereafter, water was added to the resulting mixture at a rate of 2.4 part/hour per 100 parts of phenol novolak resin and crosslinking reaction of silicone rubber was carried out for 5 hours at 170° C while distilling out the generated byproducts from the reaction system. The unnecessary water remaining in the reaction system was removed by vacuum dehydration to obtain the phenol-based resin composition.

The composition had an average particle size of dispersed silicone rubber of 10 μm.

EXAMPLE 2

A hundred parts of phenol aralkyl resin (Trade mark; MIREX.XL-225, manufactured by Mitsui Toatsu chemicals Inc.) were heat-melted at 170° C, and 10 parts of a modified silicone oil which was illustrated by the formula (1), contained only POA groups, and had a viscosity of 2900 cst at 25° C. (Trade mark; SF8410, manufactured by Toray.Dow Corning.Silicone) were added with stirring and further stirred for 30 minutes.

Successively a mixture composed of 20 parts of organopolysiloxane which was illustrated by the formula (3) having a methyl group as $R_1$ and $R_2$ and had a hydroxyl equivalent of 4000 and silanol groups on both ends of the molecular chain and 0.2 part of methylhydrogenpolysiloxane which was illustrated by the formula (4) and had a viscosity of 30 cst at 25° C were added to the above mixture and stirred for 2 hours. Further, 0.15 part of dibutyltin dilaurate was added and stirred for 30 minutes.

Thereafter, steam was added to the resulting mixture at a rate of 6.3 parts/hour per 100 parts of phenol aralkyl resin and crosslinking reaction of silicone rubber was carried out for 2 hours at 170° C while distilling out the generated byproducts from the reaction system. The unnecessary water remaining in the reaction system was removed by vacuum dehydration to obtain the phenol-based resin composition.

The composition had an average particle size of dispersed silicone rubber of 0.1 μm.

EXAMPLE 3

A hundred parts of phenol novolak resin (Trade mark; NOVOLAK #2000, manufactured by Mitsui Toatsu Chemicals Inc.) were heat-melted at 170° C, and 0.5 part of a modified silicone oil which was illustrated by the formula (1), contained only epoxy groups, and had a viscosity of 8000 cst at 25° C and an epoxy equivalent of 3000 (Trade mark; SF8411, manufactured by Toray.Dow Corning.Silicone) was added with stirring and further stirred for 30 minutes.

Successively 10 parts of organopolysiloxane which was illustrated by the formula (3) having a methyl group as $R_1$ and $R_2$ and had a hydroxyl equivalent of 1500 and silanol groups on both ends of the molecular chain were added to the above mixture and stirred for an hour. Further, a mixture composed of 1.25 parts of tetra(n-propoxy)silane and 0.25 part of dibutyltin diacetate was added and stirred for 30 minutes.

Thereafter, water was added to the resulting mixture at a rate of 3.13 parts/hour per 100 parts of phenol novolak resin and crosslinking reaction of silicone rubber was carried out for 2 hours at 170° C while distilling out the generated byproducts from the reaction system. The unnecessary water remaining in the reaction system was removed by vacuum dehydration to obtain the phenol-based resin composition.

The composition had an average particle size of dispersed silicone rubber of 8 ηm.

EXAMPLE 4

A hundred parts of phenol resol resin (Trade mark; PS-4104, manufactured by Gun-ei Chemical Industry) were mixed with 120 parts of acetone and heat-melted at 60° C, and 7 parts of a modified silicone oil which was illustrated by the formula (1), contained only POA group, and had a viscosity of 320 cst at 25° C (Trade mark; SH3771, manufactured by Toray.Dow Corning.Silicone) were added with stirring and further stirred for 30 minutes.

Successively 30 parts of organopolysiloxane which was illustrated by the formula (3) having a methyl group as $R_1$ and $R_2$ and had a hydroxyl equivalent of 5000 and silanol groups on both ends of the molecular chain were added to the above mixture and stirred for 2 hours. Further, a mixture composed of 0.2 part of γ-aminopropyltrimethoxysilane and 0.02 part of dibutyltin dioctoate was added and stirred for 30 minutes.

Thereafter, water was added to the resulting mixture at a rate of 2.4 parts/hour per 100 parts of phenol resol resin and crosslinking reaction of silicone rubber was carried out for 2 hours at 60° C while distilling out the generated byproducts from the reaction system. The unnecessary water remaining in the reaction system was removed by atmospheric dehydration to obtain the phenol-based resin composition.

The composition had an average particle size of dispersed silicone rubber of 1 μm.

EXAMPLE 5

A hundred parts of phenol novolak resin (Trade mark; NOVOLAK #2000, manufactured by Mitsui Toatsu.Chemicals Inc.) were heat-melted at 170° C. and 2 parts of an emulsifier obtained by the addition of ethylene oxide to p-sec-butylphenol/formaldehyde condensation product which was represented by the formula (2) having $C_4$ as R in an average amount of 10.5 moles per active hydrogen were added with stirring and further stirred for 30 minutes.

Successively 10 parts of organopolysiloxane which was illustrated by the formula (3) having a methyl group as $R_1$ and $R_2$ and had a hydroxyl equivalent of 2000 and silanol groups on both ends of the molecular chain were added to the above mixture and stirred for an hour. Further, a mixture composed of 0.2 part of methyltrimethoxysilane and 0.01 part of dibutyltin diacetate was added and stirred for 30 minutes.

Thereafter, water was added to the resulting mixture at a rate of 5.2 parts/hour per 100 parts of phenol novolak resin and crosslinking reaction of silicone rubber was carried out for 12 hours at 170° C while distilling out the generated byproducts from the reaction system. The unnecessary water remaining in the reaction system was removed by vacuum dehydration to obtain the phenol-based resin composition.

The composition had an average particle size of dispersed silicone rubber of 10 μm.

EXAMPLE 6

A hundred parts of phenol aralkyl resin (Trade mark; MIREX XL-225, manufactured by Mitsui toatsu Chemicals Inc.) were heat-melted at 170° C, and 3 parts of an emulsifier obtained by the addition of ethylene oxide to nonylphenol/formaldehyde condensation product which was represented by the formula (2) having C9 as R and 2 as n in an average amount of 31.5 moles per active hydrogen were added with stirring and further stirred for 30 minutes.

Successively a mixture composed of 20 parts of organopolysiloxane which was illustrated by the formula (3) having a methyl group as $R_1$ and $R_2$ and had a hydroxyl equivalent of 5000 and silanol groups on both ends of the molecular chain and 0.3 part of methylhydrogenpolysiloxane which was illustrated by the formula (4) and had a viscosity of 30 cst at 25° C were added to the above mixture and stirred for 2 hours. Further, 0.1 part of dibutyltin dilaurate was added and stirred for 30 minutes.

Thereafter, water was added to the resulting mixture at a rate of 1.33 parts/hour per 100 parts of phenol aralkyl resin and crosslinking reaction of silicone rubber was carried out for 2 hours at 170° C while distilling out the generated byproducts from the reaction system. The unnecessary water remaining in the reaction system was removed by vacuum dehydration to obtain the phenol-based resin composition.

The composition had an average particle size of dispersed silicone rubber of 6 μm.

EXAMPLE 7

A hundred parts of phenol aralkyl resin (Trade mark; MIREX XL-225, manufactured by Mitsui Toatsu Chemicals Inc.) were heat-melted at 170° C, and 5 parts of an emulsifier obtained by the addition of ethylene oxide to nonylphenol/formaldehyde condensation product which was represented by the formula (2) having $C_9$ as R and 8 as n in an average amount of 60 moles per active hydrogen were added with stirring and further stirred for 30 minutes.

Successively a mixture composed of 30 parts of organopolysiloxane which was illustrated by the formula (3) having a methyl group as $R_1$ and $R_2$ and had a hydroxyl equivalent of 1500 and silanol groups on both ends of the molecular chain and 1 part of tetra(n-propoxy)silane were added to the above mixture and stirred for 1 hour. Further, 0.02 part of dibutyltin dilaurate was added and stirred for 30 minutes.

Thereafter, water was added to the resulting mixture at a rate of 2.44 parts/hour per 100 parts of phenol aralkyl resin and crosslinking reaction of silicone rubber was carried out for 3 hours at 170° C while distilling out the generated byproducts from the reaction system. The unnecessary water remaining in the reaction system was removed by vacuum dehydration to obtain the phenol-based resin composition.

The composition had an average particle size of dispersed silicone rubber of 0.1 μm.

EXAMPLE 8

A hundred parts of phenol novolak resin (Trade mark; NOVOLAK #2000, manufactured by Mitsui Toatsu Chemical Inc.) were heat-melted at 170° C, and 0.3 part of an emulsifier obtained by adding 40 moles in average of ethylene oxide and 20 moles in average of propylene oxide per active hydrogen group to dodecylphenol/formaldehyde condensation product of the formula (2) having $C_{12}$ as R and 8 as n was added and stirred for 30 minutes.

Successively 5 parts of organopolysiloxane which was illustrated by the formula (3) having a methyl group as $R_1$ and $R_2$ and had a hydroxyl equivalent of 8000 and silanol groups on both ends of the molecular chain were added to the above mixture. Further, a mixture of 5 parts of methylhydrogenpolysiloxane which was represented by the formula (4) and had a viscosity of 30 cst at 25° C and 0.01 part of dibutyltin dioctoate was added and stirred for 30 minutes.

Thereafter, water was added to the resulting mixture at a rate of 0.9 parts/hour per 100 parts of phenol novolak resin and crosslinking reaction of silicone rubber was carried out for 5 hours at 170° C while distilling out the generated byproducts from the reaction system. The unnecessary water remaining in the reaction system was removed by vacuum dehydration to obtain the phenol-based resin composition.

The composition had an average particle size of dispersed silicone rubber of 0.4 μm.

EXAMPLE 9

A hundred parts of naphthol aralkyl resin obtained from α-naphthol and p-xylene dimethyl ether (melting point 105° C) were heat-melted at 170° C, and 2 parts of modified silicone oil which was illustrated by the formula (1), contained both epoxy and POA groups, and had a viscosity of 3500 cst at 25° C and an epoxy equivalent of 6400 (Trade mark; SF-8421, manufactured by Toray.Dow Corning.Silicone) were added with stirring and further stirred for 30 minutes.

Successively 10 parts of organopolysiloxane which was illustrated by the formula (3) having a methyl group as $R_1$ and $R_2$ and had a hydroxyl equivalent of 2000 and silanol groups on both ends of the molecular chain were added to the above mixture and stirred for an hour. Further, a mixture composed of 0.25 part of methyltrimethoxysilane and 0.02 part of dibutyltin diacetate was added and stirred for 30 minutes.

Thereafter, water was added to the resulting mixture at a rate of 2.0 parts/hour per 100 parts of naphthol aralkyl resin and crosslinking reaction of silicone rubber was carried out for 5 hours at 170° C while distilling out the generated byproducts from the reaction system. The unnecessary water remaining in the reaction system was removed by vacuum dehydration to obtain the phenol-based resin composition.

The composition had an average particle size of dispersed silicone rubber of 10 μm.

COMPARATIVE EXAMPLE 1

A hundred parts of phenol novolak resin (Trade mark; NOVOLAK #2000, manufactured by Mitsui Toatsu Chemicals Inc.) were heat-melted at 170° C, and 3 parts of modified silicone oil which was illustrated by the formula (1), contained both epoxy and POA groups, and had a viscosity of 3500 cst at 25° C and an epoxy equivalent of 6400 (Trade mark; SF-8421, manufactured by Toray.Dow Corning.Silicone) were added with stirring and further stirred for 30 minutes.

Successively 10 parts of organopolysiloxane which was illustrated by the formula (3) having a methyl group as $R_1$ and $R_2$ and had a hydroxyl equivalent of 2000 and silanol groups on both ends of the molecular chain were added to the above mixture and stirred for an hour. Further, a mixture composed of 0.25 part of methyltrimethoxysilane and 0.02 part of dibutyltin diacetate was added. Crosslinking reaction of silicone rubber was conducted under stirring at 170° C for 5 hours. Thus a phenol-based resin composition having an average particle size of dispersed silicone rubber of 10 μm was obtained.

COMPARATIVE EXAMPLE 2

A hundred parts of phenol aralkyl resin (Trade mark; MIREX XL-225, manufactured by Mitsui Toatsu Chemicals Inc.) were heat-melted at 170° C, and 10 parts of modified silicone oil which was illustrated by the formula (1), contained only POA groups, and had a viscosity of 2900 cst at 25° C (Trade mark; SF-8410, manufacture by Toray.Dow Corning.Silicone) were added with stirring and further stirred for 30 minutes.

Successively a mixture composed of 20 parts of organopolysiloxane which was illustrated by the formula (3) having a methyl group as $R_1$ and $R_2$ and had a hydroxyl equivalent of 4000 and silanol groups on both ends of the molecular chain and 0.2 part of methylhydroganpolysiloxane which was illustrated by the formula (4) and had a viscosity of 30 cst at 25° C were added and crosslinking reaction of silicone rubber was carried out under stirring at 170° C for 2 hours. The phenol-based resin.composition thus obtained had an average particle size of dispersed silicone rubber of 0.1 μm.

COMPARATIVE EXAMPLE 3

The same procedures as described in Example 1 were carried out except that the emulsifier illustrated by the formula (1) and water were not used. The phenol-base resin composition thus obtained had an average particle size of dispersed silicone particles of 30 μm.

TEST EXAMPLE 1

Each 100 parts of the phenol-based resin composition obtained in Examples 1 to 3 and 5 to 9, and Comparative examples 1 to 3 were respectively mixed with 10 parts of hexamethylenetetramine. The resulting mixtures were powdered. The phenol-resin composition obtained in example 4 was powdered as such. Each powder thus obtained was allowed to stand for the time illustrated in Table 1, and then time-dependent change of flowability was evaluated according to JIS K-6910.

The phenol-based resin composition obtained in each example did not exhibit time-dependent variation of flowability and proved good storage stability in processability.

On the other hand, compositions prepared by comparative examples completely lost flowability within the test period.

TEST EXAMPLE 2

Each 100 parts of the phenol-based resin composition obtained in Examples 1 to 3 and 5 to 9, and Comparative examples 1 to 3 were respectively mixed with 12 parts of hexamethylenetetramine, 120 parts of glass fiber, 60 parts of clay, 2 parts of stearic acid and 3 parts of carbon black. Each mixture thus obtained was kneaded with hot rolls at 110 to 120° C for 3 minutes and crushed to form molding powder.

The phenol-based resin composition obtained in Example 4 was treated by the same procedures as above except that hexamethylenetetramine was not used and molding powder was prepared.

Each molding powder thus obtained was respectively divided into two portions. One portion was immediately subjected to the following tests. Another portion was subjected to the same tests after being allowed to stand for 180 days.

Each powder was compression molded at 170° C for 10 minutes under pressure of 100 kg/cm2. The properties of the molded specimens were measured by the following methods.

(1) Charpy Impact Test conducted in accordance with JIS K-6911

(2) Flexural Test conducted in accordance with JIS K-6911

(3) Thermal Shock Resistance Test

A specimen having a diameter of 609 mm and a thickness of 10 mm was molded with an insert of square iron panel having dimensions 30 × + ×5 mm. The molded specimen was placed in a constant temperature oven at 400° C. for 30 minutes and then submerged into water for 10 minutes. The cycle procedure was repeated until crack was developed and number of cycles were examined.

The specimens prepared from the phenol-based resin compositions obtained in each example did not exhibit time-dependent variation in these tests.

On the other hand, specimens prepared by comparative examples exhibited remarkable deterioration of properties after 180 days.

Results are illustrated in Table 2.

TABLE 1

| Time passage (day) | Example | | | | | | | | | Comparative Example | | |
|---|---|---|---|---|---|---|---|---|---|---|---|---|
| | 1 | 2 | 3 | 4 | 5 | 6 | 7 | 8 | 9 | 1 | 2 | 3 |
| 1 | 38 | 26 | 45 | 89 | 42 | 23 | 25 | 51 | 95 | 38 | 26 | 37 |
| 3 | 38 | 26 | 45 | 89 | 42 | 23 | 25 | 51 | 96 | 38 | 26 | 36 |
| 7 | 38 | 25 | 46 | 88 | 42 | 23 | 25 | 51 | 95 | 21 | 26 | 20 |
| 10 | 38 | 26 | 45 | 88 | 42 | 23 | 25 | 51 | 95 | 15 | 26 | 13 |
| 14 | 38 | 25 | 45 | 88 | 41 | 23 | 25 | 51 | 94 | 0 | 26 | 0 |
| 20 | 38 | 26 | 45 | 88 | 41 | 23 | 25 | 50 | 94 | | 26 | |
| 30 | 39 | 26 | 45 | 89 | 41 | 23 | 25 | 50 | 94 | | 25 | |
| 40 | 38 | 26 | 45 | 89 | 41 | 23 | 25 | 52 | 95 | | 26 | |
| 50 | 38 | 26 | 45 | 89 | 42 | 22 | 26 | 52 | 94 | | 24 | |
| 60 | 38 | 26 | 44 | 89 | 42 | 23 | 26 | 50 | 95 | | 23 | |
| 70 | 37 | 26 | 45 | 89 | 42 | 23 | 26 | 50 | 95 | | 20 | |
| 80 | 38 | 26 | 46 | 89 | 43 | 22 | 26 | 51 | 95 | | 17 | |

TABLE 1-continued

| Time passage (day) | Example | | | | | | | | | Comparative Example | | |
|---|---|---|---|---|---|---|---|---|---|---|---|---|
| | 1 | 2 | 3 | 4 | 5 | 6 | 7 | 8 | 9 | 1 | 2 | 3 |
| 90 | 38 | 26 | 45 | 88 | 43 | 23 | 25 | 50 | 96 | 15 | | |
| 100 | 38 | 27 | 45 | 89 | 43 | 23 | 25 | 51 | 95 | 10 | | |
| 120 | 38 | 26 | 45 | 89 | 43 | 23 | 25 | 50 | 95 | 0 | | |
| 150 | 38 | 26 | 46 | 88 | 43 | 23 | 25 | 51 | 95 | | | |
| 180 | 38 | 26 | 46 | 88 | 43 | 23 | 24 | 50 | 94 | | | |

Flowability test (JIS K-6910): Unit (mm)

TABLE 2

| | Charpy impact (kg cm/cm$^2$) | | Thermal shock (cycle) | | Flexural strength (kg/mm$^2$) | |
|---|---|---|---|---|---|---|
| | After molding | After 180 days | After molding | After 180 days | After molding | After 180 days |
| Example 1 | 7.0 | 6.8 | 9 | 9 | 13.0 | 12.5 |
| Example 2 | 7.4 | 7.5 | 17 | 16 | 14.1 | 13.9 |
| Example 3 | 6.9 | 6.9 | 7 | 8 | 13.8 | 14.1 |
| Example 4 | 7.1 | 7.0 | 8 | 7 | 12.7 | 12.5 |
| Example 5 | 6.9 | 7.1 | 7 | 8 | 13.5 | 13.6 |
| Example 6 | 7.4 | 7.2 | 15 | 13 | 14.0 | 13.6 |
| Example 7 | 7.3 | 7.1 | 19 | 18 | 14.1 | 14.2 |
| Example 8 | 7.0 | 6.9 | 9 | 8 | 13.2 | 12.8 |
| Example 9 | 5.0 | 4.8 | 5 | 5 | 10.0 | 9.8 |
| Comparative Example 1 | 7.0 | 3.0 | 8 | 0 | 13.0 | 9.8 |
| Comparative Example 2 | 7.4 | 4.2 | 16 | 0 | 14.1 | 11.2 |
| Comparative Example 3 | 6.0 | 3.0 | 7 | 0 | 12.1 | 9.3 |

We claim:

1. A preparation process for a resin composition having phenolic hydroxyl groups comprising the steps of mixing a heat-melted resin having phenolic hydroxyl groups with an emulsifier, organopolysiloxane having silanol groups on both ends of a molecular chain, a crosslinking agent for silanol condensation and a catalyst for the silanol crosslinking; conducting a condensation reaction of said organopolysiloxane in said resin having phenolic hydroxyl groups with continuous or intermittent charging of water to the resultant mixture; dispersing crosslinked silicone rubber in said resin having phenolic hydroxyl groups; and removing water after finishing the reaction.

2. The preparation process of claim 1 wherein the resin having phenolic hydroxyl groups is a resin selected from the group consisting of a novolak phenol resin obtained by reacting a compound having phenolic hydroxyl groups and formaldehyde, resol phenol resin, phenol aralkyl resin which is a polymer of said compound having phenolic hydroxyl groups and p-xylylene dihalide or p-xylylene xylylene dialkyl ether, and napthol aralkyl resin.

3. The preparation process of claim 2 wherein the compound having phenolic hydroxyl groups is selected form phenol, cresol, xylenol, resorcinol, bisphenol A, p-tert-butylphenol, p-octylphenol and/or naphthols comprising α-naphthol and β-naphthol.

4. The preparation process of claim 1 wherein the emulsifier is a compound represented by the formula (1):

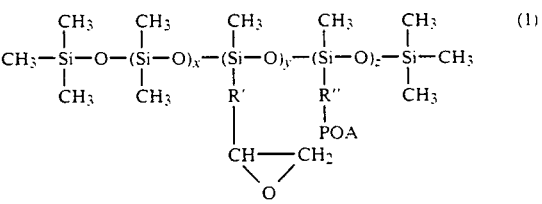

wherein R' and R" are same or different divalent hydrocarbon group of $C_2$ to $C_5$, POA is a polyoxyalkylene group consisting of an ethylene oxide and/or propylene oxide addition product, x is an integer of from 200 to 990, y + z = 10 − 800, and x + y + z < 1000; or a compound represented by the formula (2):

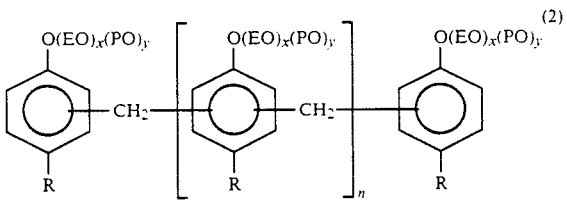

wherein R is an alkyl group of $C_4$ to $C_{12}$, n is an integer of from 1 to 20 in average, EO is an ethylene oxide moiety, PO is a propylene oxide moiety, x and y are integers of from 0 to 100 and 5 ≦ +y ≦ 100.

5. The preparation process of claim 4 wherein the emulsifier represented by the formula (1) or (2) is added in an amount of from 0.01 to 25 parts by weight per 100 parts by weight of the resin having phenolic hydroxyl groups.

6. The preparation process of claim 1 wherein the organopolysiloxane having silanol groups on both ends of the molecular chain is a compound represented by the formula (3):

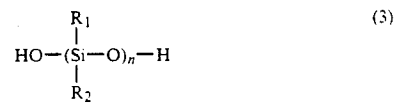

wherein $R_1$ and $R_2$ are same or different monovalent hydrocarbon groups and selected from the group consisting of a methyl, ethyl, propyl, butyl, phenyl, xylyl, γ-chloropropyl and 3,3,3-trifluoropropyl group.

7. The preparation process of claim 6 wherein the organopolysiloxane represented by the formula (3) is added in an amount of from 3 to 50 parts by weight per 100 parts by weight of the resin having phenolic hydroxyl groups.

8. The preparation process of claim 1 wherein the crosslinking agent for silanol condensation is a multifunctional silane having three or more functional groups directly bonded to the silicon atom and selected from the group consisting of an alkoxy, acyloxy, ketoxim, alkenyloxy, aminoxy, amino and hydroxy group; or is methylhydrogenpolysiloxane represented by the formula (4):

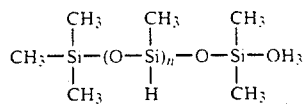

wherein is an integer of from 3 to 10,000.

9. The preparation process of claim 8 wherein the multifunctional silane or methylhydrogenpolysiloxane is added in an amount of from 0.05 to 5 parts by weight per 100 parts by weight of the resin having phenolic hydroxyl groups.

10. The preparation process of claim 1 wherein the catalyst for silanol crosslinking is an organotin compound.

11. The preparation process of claim 10 wherein the organotin compound is added in an amount of 5 parts by weight or less per 100 parts by weight of organopolysiloxane having silanol groups on both ends of the molecular chain.

12. The preparation process of claim 1 wherein water is added in an amount of from 0.1 to 100 parts by weight per 100 parts by weight of the resin having phenolic hydroxyl groups.

* * * * *

UNITED STATES PATENT AND TRADEMARK OFFICE
CERTIFICATE OF CORRECTION

PATENT NO. : 5,132,349

DATED : July 21, 1992

INVENTOR(S) : Iimuro et al.

It is certified that error appears in the above-identified patent and that said Letters Patent is hereby corrected as shown below:

In column 13, line 56, delete "and" and insert therefor --with--.

In column 13, line 63, delete "form" and insert therefor --from--.

In column 16, line 7, after "wherein" insert --n--.

Signed and Sealed this

Fifth Day of October, 1993

BRUCE LEHMAN

*Attest:*

*Attesting Officer*                    Commissioner of Patents and Trademarks